(12) United States Patent
Laufer et al.

(10) Patent No.: US 10,063,309 B2
(45) Date of Patent: Aug. 28, 2018

(54) METHOD AND SYSTEM FOR ADDRESSING LINE OF SIGHT BLOCKAGE IN SATELLITE COMMUNICATION NETWORKS

(71) Applicant: Elbit Systems Land and C4I Ltd., Netanya (IL)

(72) Inventors: Shaul Laufer, Petach Tikva (IL); Ariel Saghiv, Petach Tikva (IL)

(73) Assignee: Elbit Systems Land and C4I Ltd., Netanya (IL)

( * ) Notice: Subject to any disclaimer, the term of this patent is extended or adjusted under 35 U.S.C. 154(b) by 0 days.

(21) Appl. No.: 15/121,046

(22) PCT Filed: Feb. 25, 2015

(86) PCT No.: PCT/IL2015/050210
§ 371 (c)(1),
(2) Date: Aug. 24, 2016

(87) PCT Pub. No.: WO2015/128864
PCT Pub. Date: Sep. 3, 2015

(65) Prior Publication Data
US 2017/0012698 A1    Jan. 12, 2017

(30) Foreign Application Priority Data

Feb. 26, 2014    (IL) .......................................... 231180

(51) Int. Cl.
*H04B 7/185*      (2006.01)
*H04B 17/318*     (2015.01)
(Continued)

(52) U.S. Cl.
CPC ......... *H04B 7/18513* (2013.01); *H04B 7/043* (2013.01); *H04B 7/18536* (2013.01);
(Continued)

(58) Field of Classification Search
CPC ............. H04W 28/08; H04W 36/0088; H04W 52/223; H04W 76/028
(Continued)

(56) References Cited

U.S. PATENT DOCUMENTS 5,257,405 A   10/1993   Reitberger
5,946,603 A    8/1999   Ibanez-Meier
(Continued)

FOREIGN PATENT DOCUMENTS

WO   WO 2009/010254   1/2009

OTHER PUBLICATIONS

International Search Report of PCT Application No. PCT/IL2015/050210, dated Jun. 8, 2015.
(Continued)

*Primary Examiner* — Tu X Nguyen
(74) *Attorney, Agent, or Firm* — Pearl Cohen Zedek Latzer Baratz LLP

(57) ABSTRACT

Method and system for addressing line of sight (LOS) blockage in satellite communication networks are provided herein. The method may include the following stages: obtaining forecast input parameters; forecasting at least one future LOS blockage in two or more communication links established between at least one communication satellite and at least one platform-mounted communication system having at least one antenna, based on the forecast input parameters; and addressing the future LOS blockage by applying at least one of: rerouting the communication links between the at least one platform-mounted communication system and at least one of the communication satellite; changing a power level of at least one of the communication links; changing at least one of: spreading, modulation and coding (Continued)

of at least one of the communication links; changing mobility parameters of the platform-mounted communication system.

21 Claims, 4 Drawing Sheets

(51) Int. Cl.
*H04B 7/0426* (2017.01)
*H04B 7/216* (2006.01)
*H04W 28/08* (2009.01)
*H04W 52/22* (2009.01)

(52) U.S. Cl.
CPC ........... *H04B 7/216* (2013.01); *H04B 17/318* (2015.01); *H04W 28/08* (2013.01); *H04W 52/223* (2013.01)

(58) Field of Classification Search
USPC ............... 455/522, 69, 450, 452.1, 453, 439
See application file for complete search history.

(56) References Cited

U.S. PATENT DOCUMENTS

| | | |
|---|---|---|
| 8,194,573 B1 | 6/2012 | Smith et al. |
| 2012/0021694 A1 | 1/2012 | Prince et al. |
| 2012/0127921 A1 | 5/2012 | Laufer |
| 2015/0327302 A1* | 11/2015 | Firoiu .................. H04W 16/18 455/509 |

OTHER PUBLICATIONS

Extended European Search Report of EP Application No. EP15755032.8, dated Sep. 26, 2017.

* cited by examiner

METHOD AND SYSTEM FOR ADDRESSING LINE OF SIGHT BLOCKAGE IN SATELLITE COMMUNICATION NETWORKS

CROSS-REFERENCE TO RELATED APPLICATIONS

This application is a National Phase Application of PCT International Application No. PCT/IL2015/050210, International Filing Date Feb. 25, 2015, entitled: "METHOD AND SYSTEM FOR ADDRESSING LINE OF SIGHT BLOCKAGE IN SATELLITE COMMUNICATION NETWORKS", published on Sep. 3, 2015 as International Patent Application Publication No. WO 2015/128864, claiming priority of Israel Patent Application No. 231180, filed Feb. 26, 2014, which is hereby incorporated by reference in its entirety.

FIELD OF THE INVENTION

The present invention relates generally to the field of satellite communication and more particularly to rerouting satellite communication links responsive to line of sight blockage of any kind.

BACKGROUND OF THE INVENTION

Prior to setting forth a short discussion of the related art, it may be helpful to set forth definitions of certain terms that will be used hereinafter.

The term "vehicle" as used herein, is defined as a mobile machine that transports passengers or cargo. Vehicles that do not travel on land include watercraft, aircraft and spacecraft and are also included in vehicle as defined herein. In some embodiments, a vehicle may also include a platform which is even a more generalized term defined as any object, either stationary or in motion, to which a payload such as a satellite communication system, may be mounted.

The term "reception quality parameters" as used herein, is defined as quantitative indicators of the ability of a channel to convey data over a communication link.

The term "received signal strength indicator" (RSSI) as used herein, is a measurement of the power present in a received radio signal.

The term "equivalent isotropically radiated power" (EIRP) is the amount of power that a theoretical isotropic antenna (which evenly distributes power in all directions) would emit to produce the peak power density observed in the direction of maximum antenna gain. EIRP can take into account the losses in transmission line and connectors and includes the gain of the antenna. The EIRP is often stated in terms of decibels over a reference power emitted by an isotropic radiator with equivalent signal strength. The EIRP allows comparisons between different emitters regardless of type, size or form.

The term "line of sight (LOS) blockage" as used herein, is any scenario in which a degradation of the reception quality parameters goes below a predefined level that results in at least partial blockage of the data transfer or even a full blockage thereof.

The term "mobility parameters" as used herein may include, position, orientation and velocity and any derivative thereof of a platform or a satellite.

The term "rerouting" or as used herein relates both to rerouting in the network level and in the physical level and may include any change of the path of a communication between a two nodes in a communication network. Rerouting in the network level may include any change of the flow of data from one node to another via different nodes. In the physical level, rerouting relates to a spatial change of the communication link, usually from the transmit antenna to the receive antenna, wherein the communication link may include relays along the path.

LOS blockage is a main reason for degradation of satellite communication (typically a geostationary satellite). Any vehicle-mounted satellite communication system is dependent upon a clear LOS with the communication satellite. While addressing LOS blockage in real time is known in the art, predicting LOS blockage and tailoring the appropriate remedy for the specific type of LOS blockage has not yet addressed. It would be therefore advantageous to provide a method that will enable to use alternative satellite communication links whenever such a blockage is predicted.

SUMMARY OF THE INVENTION

The present invention, in embodiments thereof, addresses the challenge of managing line of sight blockage in satellite communication networks. The method may include the following stages: obtaining forecast input parameters; forecasting at least one future line of sight (LOS) blockage in two or more communication links established between at least one communication satellite and at least one platform-mounted communication system having at least one antenna, based on the forecast input parameters; and addressing the future LOS blockage by applying at least one of: rerouting the communication links between the platform-mounted communication system and at least one of the communication satellite; changing a power level of at least one of the communication links; changing at least one of: spreading, modulation and coding of at least one of the communication links; changing mobility parameters of the platform-mounted communication system.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

Figure 1:
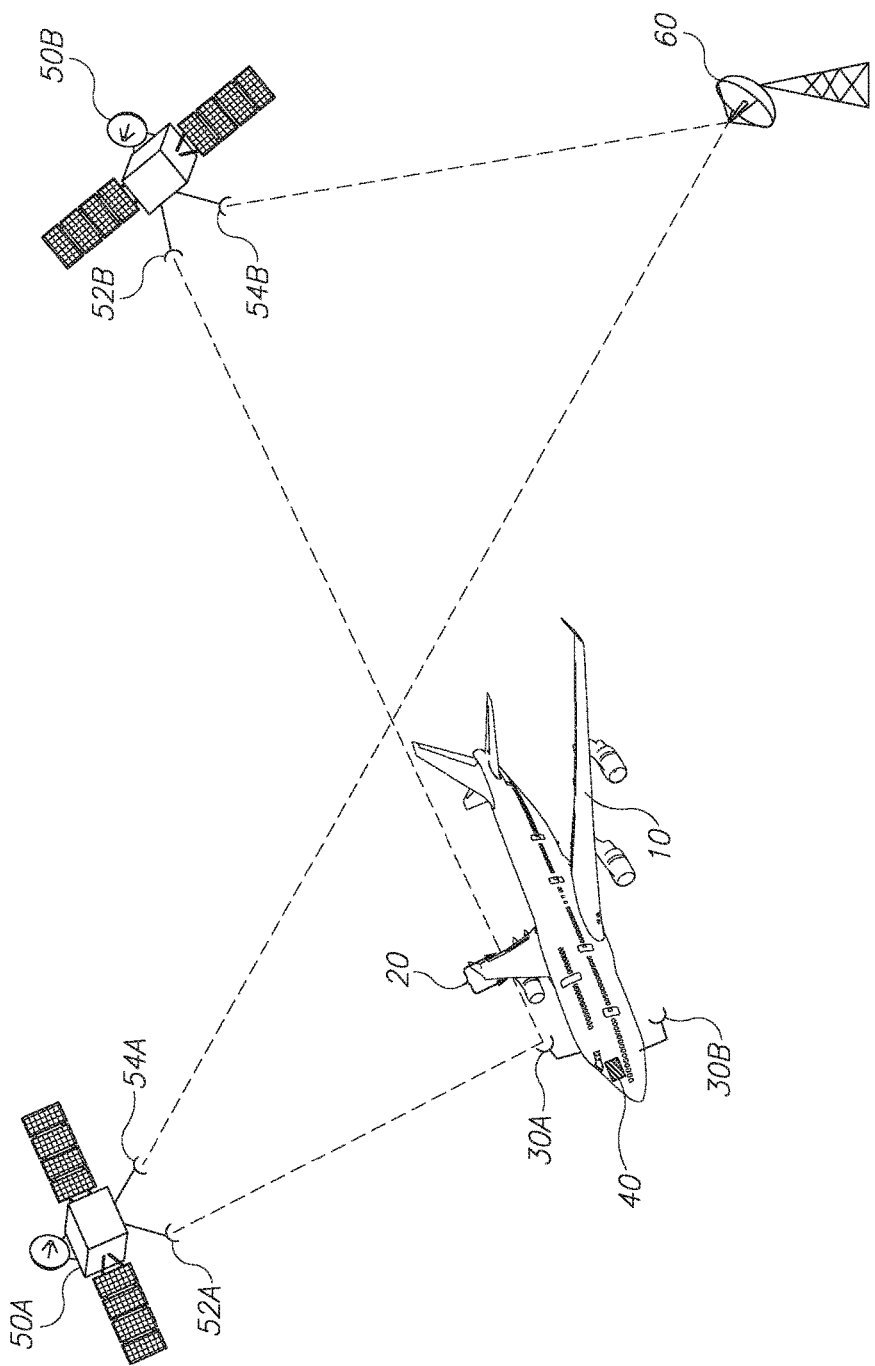
FIG. 1 is a high level schematic diagram illustrating an aspect of a system in accordance with some embodiments of the present invention.

The drawings together with the following detailed description make the embodiments of the invention apparent to those skilled in the art.

DETAILED DESCRIPTION OF THE INVENTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

FIG. 1 is a high level schematic diagram illustrating an aspect of a system in accordance with some embodiments of the present invention. A vehicle 10, possibly an aerial vehicle as depicted but may be any type of vehicle, is equipped with a vehicle-mounted satellite communication system 40 which is operatively associated with at least one antenna 30A and 30B. A plurality of communication satellites 50A and 50B is in communication with ground station 60 which is in turn in communication with a control center (not shown here). Vehicle-mounted satellite communication system 40 may communicate with each of communication satellites 50A and 50B via any of its antennas 30A and 30B having a direct line of sight with communication satellites 50A and 50B. Due to the geometry of the vehicle 10, it may be the case that some part of vehicle 10, such as wing 20 may cause a line of sight (LOS) blockage, which even temporarily, may prevent antenna 30A from receiving communication coming from antenna 52B and vice versa. In this scenario, once the degradation is detected, the communication can be rerouted to antenna 52A of satellite 50A. In some embodiments, the change of orientation of vehicle 10 may be predicted over time based on its speed, direction and planned route so that a future LOS blockage may be predicted and the rerouting may be carried out before an actual blockage takes place.

Figure 2:
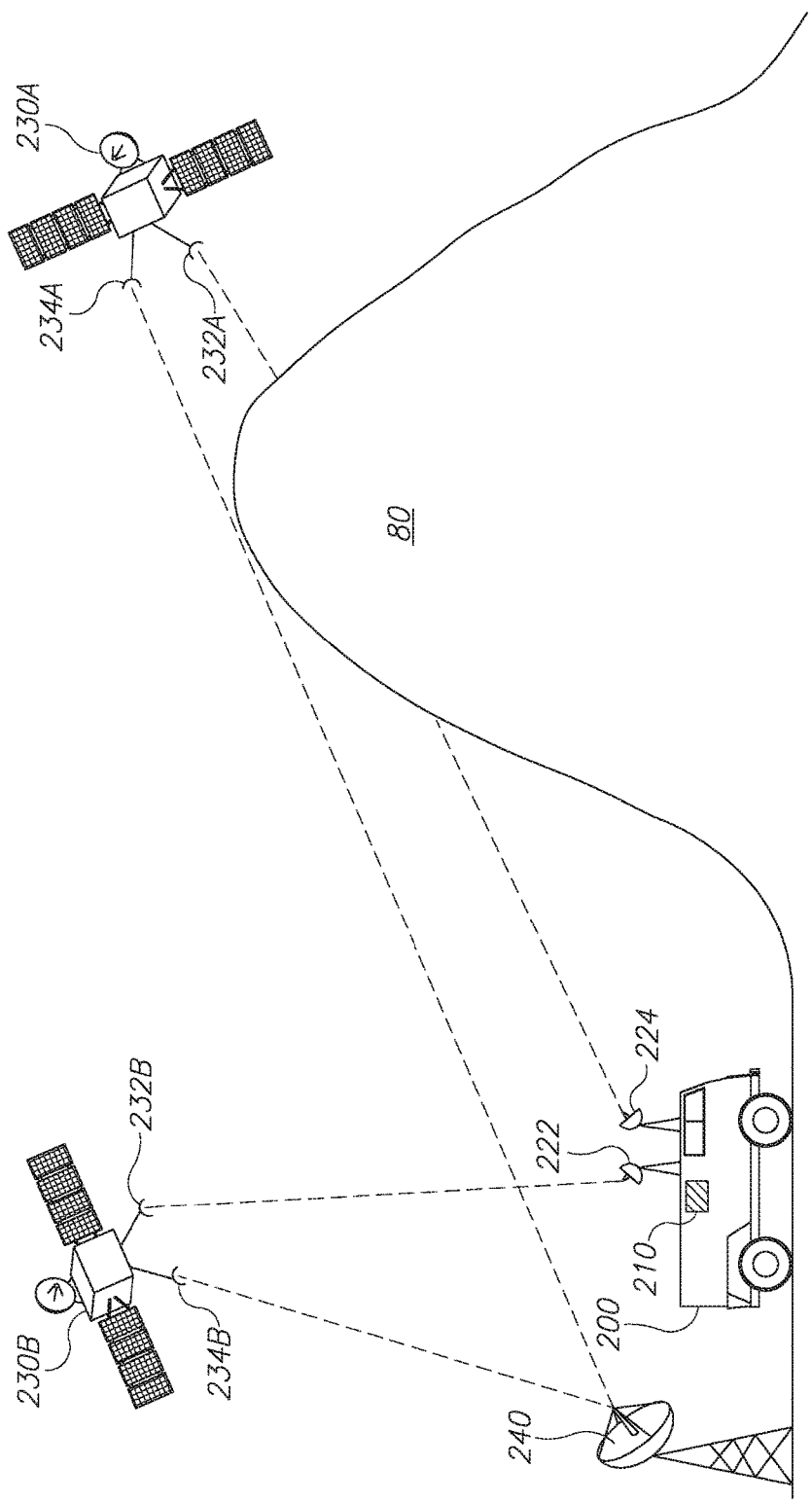
FIG. 2 is a high level schematic diagram illustrating another aspect of a system in accordance with some embodiments of the present invention.

FIG. 2 is a high level schematic diagram illustrating another aspect of a system in accordance with some embodiments of the present invention. A vehicle 200, possibly a ground vehicle as depicted but may be any type of vehicle, is equipped with a vehicle-mounted satellite communication system 210 which is operatively associated with at least one antenna 222 and 224. A plurality of communication satellites 230A and 230B is in communication with ground station 240 which is in turn in communication with a control center (not shown here). Vehicle-mounted satellite communication system 240 may communicate with each of communication satellites 230A and 230B via any of its antennas 222 and 224 provided they have a direct line of sight with antennas 232A and 232B of communication satellites 230A and 230B respectively. Due to the topographical and other environmental obstacles such as mountain 80, it may be the case that the obstacle may cause a line of sight (LOS) blockage, which even temporarily, may prevent antenna 224 from receiving communication coming from antenna 232A and vice versa. In this scenario, once the degradation is detected, the communication can be rerouted to antenna 222 of vehicle 200 and antenna 232B of satellite 230B. In some embodiments, the change of the location of vehicle 200 may be predicted over time based on its speed, direction and planned route so that a future blockage due to LOS blockage may be predicted and the rerouting may be carried out before an actual blockage takes place.

Figure 3:
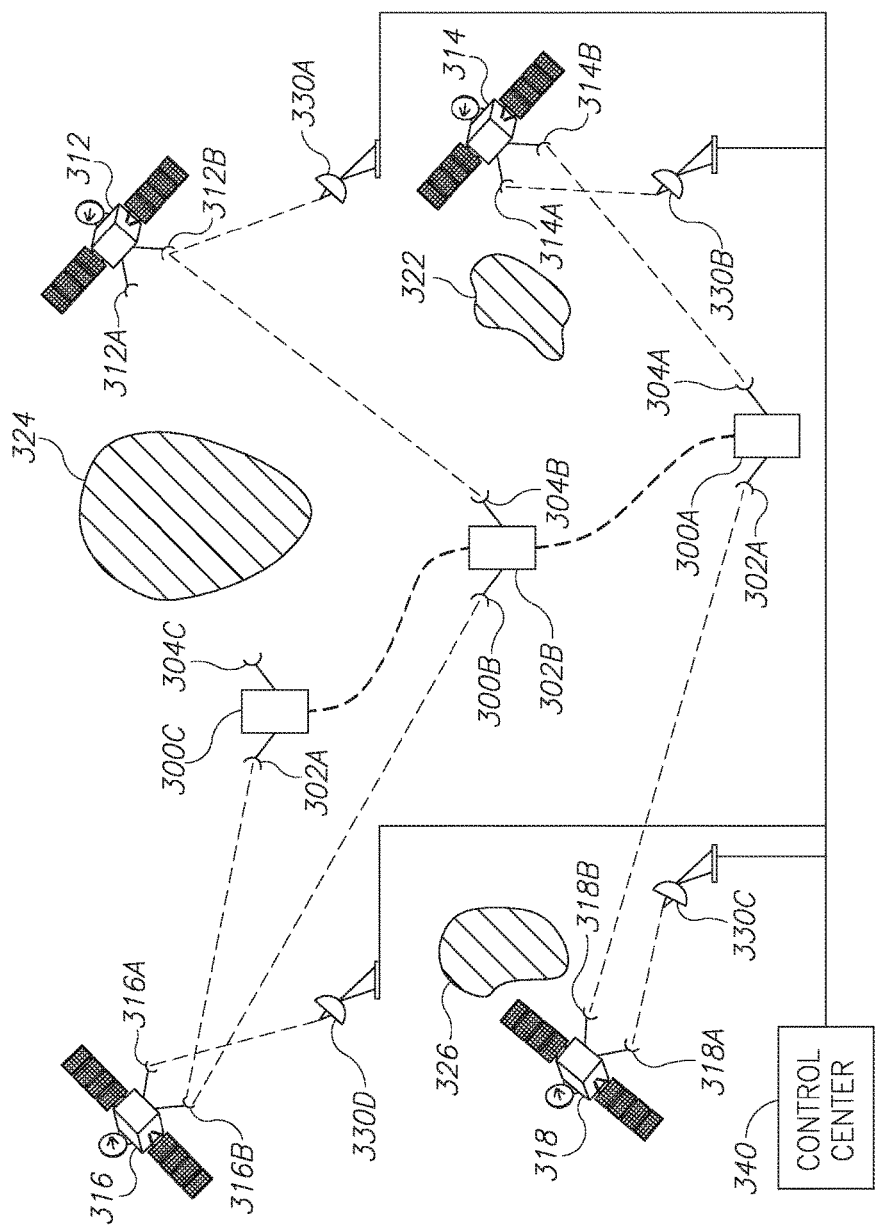
FIG. 3 is a high level schematic diagram illustrating yet another aspect of a system in accordance with some embodiments of the present invention.

FIG. 3 is a high level schematic diagram illustrating the centralistic aspect of a system in accordance with some embodiments of the present invention. The system includes at least one vehicle mounted communication system 300A having at least one antenna 302A and 304A and configured to repeatedly measure reception quality parameters of two or more communication links established between at least two communication satellites 312, 314, 316, and 318 and said at least one vehicle mounted communication system 300A. The system further includes a control center 340 configured to: determine a line of sight (LOS) blockage caused by obstacle 322 324, 326 whenever respective reception quality parameters fall below a predefined threshold; and reroute the communication links between the at least one vehicle mounted communication system and at least one of the communication satellites not associated with said LOS blockage.

In accordance with some embodiments of the present invention, two or more communication links established between at least two communication satellites and at least one vehicle mounted communication system having at least one antenna. Control center 340 may be configured to: forecast future line of sight (LOS) blockage of said two or more communication links based on movement of the vehicle (e.g. 300A to 300B and then to 300C); determine a LOS blockage whenever respective reception quality parameters fall below a predefined threshold; and reroute the communication links between the vehicle mounted communication system and at least one of the communication satellites not associated with said LOS blockage. According to some embodiments of the present invention, the LOS blockage occurs due to a change over time in the topography proximal to the vehicle. According to some embodiments of the present invention, the LOS blockage occurs due to the morphology of vehicle and a change over time in the orientation of the vehicle.

In accordance with some embodiments of the present invention, the system may include two or more communication links established between at least one communication satellite and at least one vehicle mounted communication system having at least one antenna; and a control center configured to: obtain data affecting communication link quality parameters; predict occurrence time of a line of sight (LOS) blockage of said two or more communication links; and reroute the communication links between the vehicle mounted communication system and the at least one of the communication satellite, based on the predicted occurrence time of said LOS blockage and respective link quality parameters.

According to some embodiments of the present invention, a communication link blockage may include one of: a degradation of reception quality parameters, and a full blockage.

According to some embodiments of the present invention, the data affecting communication link quality parameters comprising at least one of: topography, terrain features, weather, vehicle mounted communication system parameters; vehicle morphology and orientation, communication satellites parameters.

According to some embodiments of the present invention, and wherein the rerouting is carried out by using another antenna of the vehicle mounted communication system.

According to some embodiments of the present invention, the forecasting of future LOS blockage is based on the topography and speed and direction of the vehicle, and rerouting the communication links based on the forecasted blockage.

According to some embodiments of the present invention, applying the rerouting may be based on prioritized content associated with the communication links and directed to the vehicle.

According to some embodiments of the present invention, the rerouting may be based on a combination of at least one of: vehicle mounted communication systems priority, content priority, and alternative communication links for each one of the vehicle mounted communication systems.

According to some embodiments of the present invention, and wherein the rerouting is carried out by using another antenna of the vehicle mounted communication system.

According to some embodiments of the present invention, further comprising forecasting future LOS blockage based on the speed and direction of the vehicle, and rerouting the communication links based on the forecasted LOS blockage.

According to some embodiments of the present invention, further comprising applying the rerouting based on prioritized content associated with the communication links and directed to the vehicle.

According to some embodiments of the present invention, wherein the rerouting is based on a combination of at least one of: vehicle mounted communication systems priority, content priority, and alternative communication links for each one of the vehicle mounted communication systems.

Figure 4:
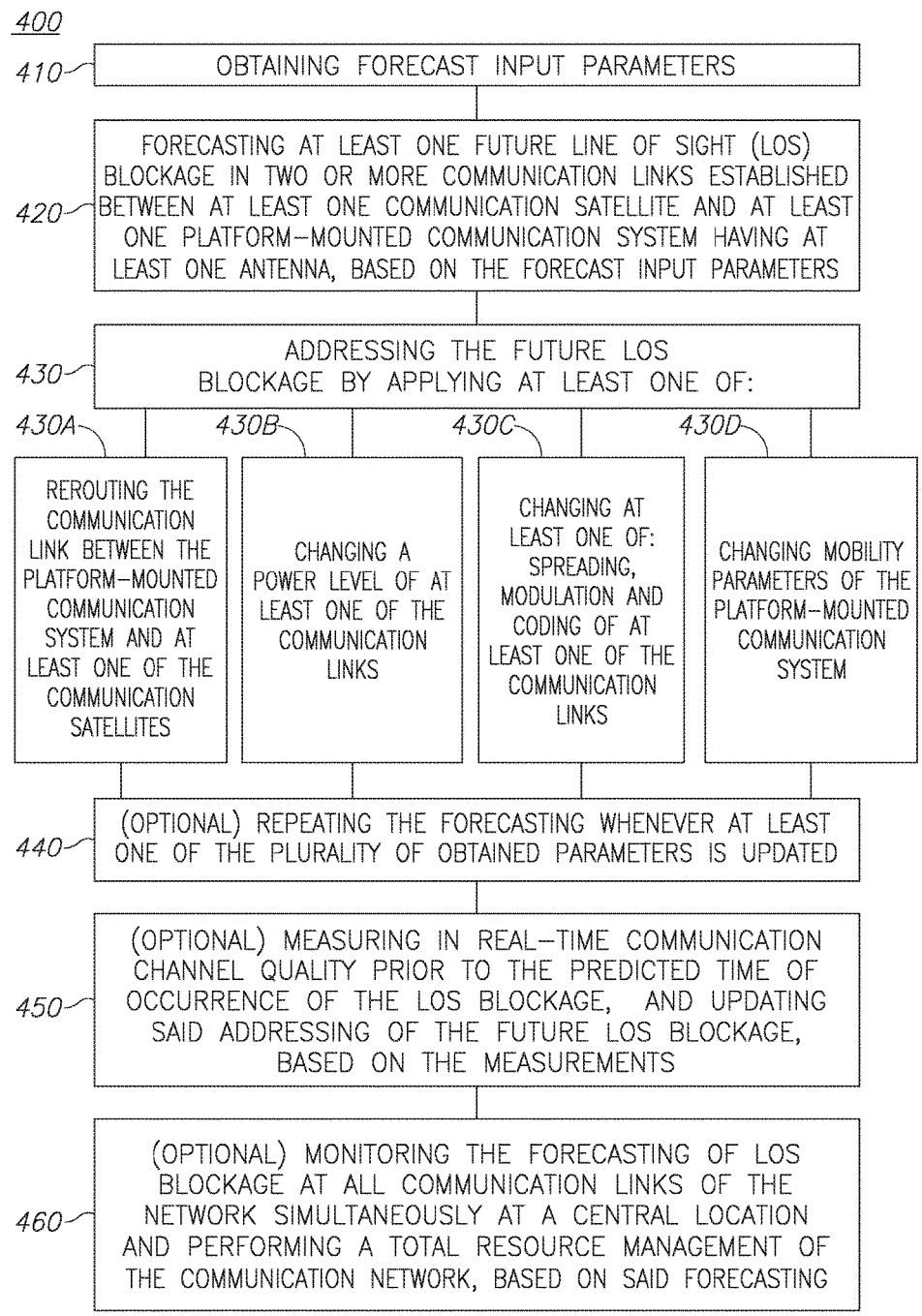
FIG. 4 is a high level flowchart diagrams illustrating aspects of a method in accordance with some embodiments of the present invention.

FIG. 4 is a high level flowchart diagrams illustrating aspects of methods in accordance with some embodiments of the present invention. Although method 400 may be implemented by the aforementioned architecture depicted in FIG. 3, it is understood that the following logic are not limited to a specific architecture.

Method 400 may include the following stages: obtaining forecast input parameters 410; forecasting at least one future line of sight (LOS) blockage in two or more communication links established between at least one communication satellite and at least one platform-mounted communication system having at least one antenna, based on the forecast input parameters 420; and addressing the future LOS blockage by applying at least one of 430: rerouting the communication links between the platform-mounted communication system and at least one of the communication satellite 430A; changing a power level of at least one of the communication links 430B; changing at least one of: spreading, modulation and coding of at least one of the communication links 430C; changing mobility parameters of the platform-mounted communication system 430D; and changing pointing direction of the antenna mounted on a vehicle.

According to some embodiments, the rerouting may be carried out by load balancing traffic over various routes, yielding a blend of communication links (as opposed to a binary decision). It is noted that load balancing is carried out based on the forecasted LOS blockage (specifically, 'soft blockage').

According to some embodiments, addressing the future LOS blockage by applying at least one of: rerouting the communication links between the platform-mounted communication system and at least one of the communication satellite; changing a power level of at least one of the communication links; changing spreading, modulation and coding (hereinafter simply referred to as "ModCod") of at least one of the communication links; changing mobility parameters of the platform-mounted communication system.

In some embodiments, the changing of the ModCod may be carried out based on EIRP and G/T. When there is an increase of the EIRP and G/T, the ModCod may be increased in order to save bandwidth. When EIRP and G/T are decreased, the ModCod is adjusted accordingly.

Additionally, the ModCod may further include spread spectrum factor data. Specifically, when moving to a lower G/T region, there is a need to increase VSAT EIRP in order to maintain link quality. When using small antennas, such increase in VSAT EIRP will also increase the interference level to adjacent satellites. In order to maintain the same interference level towards adjacent satellites, the spreading factor should also be increased in order to maintain the spectral density. Similarly, the aforementioned mechanism also operates when decreasing VSAT EIRP. The need to use the minimal required spread factor stems from the need to minimize bandwidth consumption.

According to some embodiments, EIRP coverage maps and G/T coverage maps of the satellite may be used in order to forecast partial blockage (i.e., "soft blockage") along the advancement path of the vehicle-mounted communication system.

According to some embodiments, the analysis may be carried out based on at least two beams, each coming from a different satellite. Alternatively, at least one of the communication satellites is a multi-beam communication satellite. Specifically, with multi-beam satellites or multiple beams with multiple satellites, the EIRP of may present overlapping coverage areas for the different beams.

According to some embodiments, forecast input parameters may include at least one of: 2D or 3D weather conditions, satellite parameters, communication links properties, communication network performance, platform performance, platform orientation, overall communication system/platform resources; topography, terrain, geographic location, potential relays, vehicle morphology, and system failures. Topography and terrain may be retrieved from databases such as digital terrain model (DTM). It should be noted that morphology includes variation in contour such as due to rotor of a helicopter. Weather conditions may be retrieved from weather radars and satellites which are third part sources which are external to the system.

According to some embodiments, the rerouting is further carried out based on data-aware criteria associated with a specific application of the data being communicated. Thus, the control center can determine how to divide the data between different routes and provide priority to one or more data streams based on quality of service (QoS) requirements and the like According to some embodiments, the method may further include the step of repeating the forecasting whenever at least one of the plurality of obtained measured parameters is changed so that the forecasting is event-driven by nature.

In a case of load balancing, in some embodiments the load balancing may be carried out only in a case of insufficient resources in the communication network.

In another embodiment, total resources management may be carried out. In total resource management, the assignments of a plurality of resources and a plurality of corresponding users are being managed and optimized under a set of constraints. In a non-limiting example, resource management may lead to a scenario in which a first vehicle is provided, for a specific timing, some resources at a specific link wherein if such resources are unavailable, a second vehicle having a lower priority or being indifferent to the specific resource will be rerouted to another link in order to free the resources for the first vehicle.

In an optional step, the method may include measuring in real-time communication channels quality at the predicted time of occurrence of the LOS blockage, and in a case that the forecast is determined as wrong, updating the forecasting. This may be implemented, for example, by changing the calibration of the forecasting mechanisms.

Advantageously, the method may be implemented by monitoring traffic over all communication links simultaneously at a central location and performing a total resource management of the communication network, based on the monitored communication links. The total resource management takes into account priority levels of the communication links.

According to yet another generalized embodiment of the present invention, a system for addressing LOS blockage of various types is provided herein. The system may include a blockage forecast module configured to forecast at least one future line of sight (LOS) blockage in two or more communication links established between at least one communication relay and at least one vehicle-mounted communication system having at least one antenna. The relays may include cellular communication base stations. Communication aircrafts and communication ships and any communication relay that is either stationary or attached to a moving platform. The communication links may include RF but also optical communication (e.g., laser-based communication).

The system may further include a control center configured to address the future LOS blockage by applying at least one of: rerouting the communication links between the vehicle-mounted communication system and at least one of the communication relays not associated with said LOS blockage; changing a power level of at least one of the communication links, changing modulation and coding (ModCod) of at least one of the communication links; and changing mobility parameters of the vehicle-mounted communication system.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A method for addressing line of sight blocking in satellite communication network, the method comprising:
   obtaining forecast input parameters related to the satellite communication network;
   monitoring any type of traffic over two or more communication links simultaneously, wherein the two or more communication links are established between at least one communication satellite and at least one non-stationary platform-mounted communication system having at least two antennas, wherein the at least one communication satellite and the at least one non-stationary platform-mounted communication system are part of said satellite communication network;
   forecasting at least one future line of sight (LOS) blockage in the two or more communication links, based on the forecast input parameters;
   performing a total resource management of the satellite communication network, based on the monitored communication links; and
   addressing the future LOS blockage by applying one selected method from the group consisting of rerouting at least one of the communication links,
      changing a power level of at least one of the communication links,
      changing at least one of: spreading, modulation and coding of at least one of the communication links,
      changing mobility parameters of the platform-mounted communication system,
      changing a pointing direction of at least one antenna of the platform-mounted communication system, and combinations thereof,
   wherein said addressing is carried out by considering information related to the at least one non-stationary platform-mounted communication system received through said monitoring and further based on said forecast input parameters related to the satellite communication network.

2. The method according to claim 1, the rerouting comprises changing at least one of the platform-mounted communication systems and at least one of the communication satellites, and antennas thereof.

3. The method according to claim 1, wherein the at least one communication satellite is a multi-beam communication satellite.

4. The method according to claim 1, wherein the rerouting is carried out by load balancing traffic over various routes, yielding a blend of communication links.

5. The method according to claim 1, wherein the spreading, modulation and coding further includes spread spectrum factor data.

6. The method according to claim 1, wherein the future LOS blockage comprises one of: a predicted partial blockage, and a predicted full blockage.

7. The method according to claim 1, wherein the forecast input parameters comprise at least one of: weather, satellite parameters, communication links properties, communication network performance, platform performance, platform orientation, overall communication system/platform resources; topography, terrain, geographic location, potential relays, vehicle morphology, and system failures.

8. The method according to claim 1, further comprising repeating the forecasting whenever at least one of the plurality of obtained parameters is changed.

9. The method according to claim 1, wherein the forecasting is repeated periodically.

10. The method according to claim 1, wherein the rerouting comprises load balancing available communication links based on a predefined cost function that receives as an input at least one of: priority of communication link, priority of platform-mounted communication systems, and priority of content.

11. The method according to claim 1, further comprising measuring in real-time communication channels quality at the predicted time of occurrence of the LOS blockage, and in a case that the forecast is determined as not accurate, updating the forecasting mechanisms.

12. The method according to claim 1, further comprising measuring in real-time communication channels quality prior to the predicted time of occurrence of the LOS blockage, and updating said addressing of the future LOS blockage, based on the measuring.

13. The method according to claim 1, wherein the rerouting is carried out by load balancing traffic among said at least two antennas according to actual LOS quality of each antenna measured by RSSI.

14. The method according to claim 1, wherein the rerouting is carried out by assigning content to bandwidth available over the communication links, further based on the future LOS blockages.

15. The method according to claim 1, wherein the total resource management takes into account priority levels of the communication.

16. The method according to claim 1, wherein the rerouting is further carried out based on data-aware criteria associated with a specific application of the data being communicated.

17. The method according to claim 1, wherein the prediction of the LOS blockage is further based on third party sources external to the communication network.

18. A system for addressing line of sight blocking in satellite communication network, the system comprising:
   at least one communication satellite;
   at least one non-stationary platform-mounted communication system; and,
   a control center configured to:
      forecast input parameters of the satellite communication network;
      monitor any type of traffic over two or more communication links simultaneously, wherein the two or more communication links are established between at the least one communication satellite and at the least one non-stationary platform-mounted communication system having at least two antennas, wherein said at least one communication satellite is in communication with a ground station, and wherein the at least one communication satellite the at least one non-stationary platform-mounted communication system and the ground station are part of said satellite communication network, and wherein said control center is connected to said ground station;
      predict at least one future line of sight (LOS) blockage along the two or more communication links, based on the forecast input parameters;
      perform a total resource management of the satellite communication network, based on the monitored communication links; and, address the future LOS blockage by applying one selected method from the group consisting of rerouting the communication between the platform-mounted communication system and at least one of the communication satellite,
changing a power level of at least one of the communication links,
changing at least one of: spreading, modulation and coding of at least one of the communication links,
changing mobility parameters of the platform-mounted communication system,
changing a pointing direction of at least one antenna of the platform-mounted communication system, and combinations thereof,
wherein said addressing is carried out by the control center by considering information related to the at least at least one non-stationary platform-mounted communication system received through said monitoring and further based on said forecast input parameters related to the satellite communication network.

19. The system according to claim 18, wherein the at least one communication satellite is a multi-beam communication satellite.

20. The system according to claim 18, wherein the rerouting is carried out by load balancing traffic over various routes, yielding a blend of communication links.

21. A method for addressing line of sight blocking in satellite communication network, the method comprising:
obtaining forecast input parameters related to the satellite communication network;
monitoring any type of traffic over two or more communication links simultaneously, wherein the two or more communication links are established between at least one communication satellite and at least one non-stationary platform-mounted communication system having at least two antennas, wherein the at least one communication satellite and the at least one non-stationary platform-mounted communication system are part of said satellite communication network;
forecasting at least one future line of sight (LOS) blockage in the two or more communication links, based on the forecast input parameters;
performing a total resource management of the satellite communication network, based on the monitored communication links; and
addressing the future LOS blockage by applying one selected method from the group consisting of:
rerouting at least one of the communication links,
changing a power level of at least one of the communication links,
changing at least one of: spreading, modulation and coding of at least one of the communication links,
changing mobility parameters of the platform-mounted communication system,
changing a pointing direction of at least one antenna of the platform-mounted communication system, and combinations thereof,
wherein said addressing is carried out by considering information related to the at least one non-stationary platform-mounted communication system received through said monitoring and further based on said forecast input parameters related to the satellite communication network, and
wherein said total resource management is carried out by optimizing assignments of a plurality of resources and a plurality of corresponding users under a set of constraints.

* * * * *